United States Patent
Fujisawa et al.

[11] Patent Number: 5,870,107
[45] Date of Patent: Feb. 9, 1999

[54] CHARACTER AND SYMBOL PATTERN GENERATOR BASED ON SKELETON DATA INCLUDING THICKNESS CALCULATION

[75] Inventors: Masayuki Fujisawa, Koriyama; Susumu Hasegawa, Sakai; Yutaka Shigi, Nara; Yoshiko Imaki, Osaka; Minehiro Konya, Daito, all of Japan

[73] Assignee: Sharp Kabushiki Kaisha, Osaka, Japan

[21] Appl. No.: 634,802

[22] Filed: Apr. 19, 1996

[30] Foreign Application Priority Data

Jun. 29, 1995 [JP] Japan ................................. 7-163411

[51] Int. Cl.$^6$ ....................................... G06F 17/00
[52] U.S. Cl. ........................... 345/467; 345/194; 707/535
[58] Field of Search .................... 345/469, 467, 345/171, 192, 194, 195, 442, 141, 142, 439, 468, 475; 382/259; 395/150, 151, 110; 400/110; 707/535

[56] References Cited

U.S. PATENT DOCUMENTS

| | | | |
|---|---|---|---|
| 4,748,443 | 5/1988 | Uehara et al. | 345/142 |
| 4,897,638 | 1/1990 | Kokunishi et al. | 345/142 |
| 4,931,953 | 6/1990 | Uehara et al. | 345/467 |
| 5,305,433 | 4/1994 | Ohno | 345/469 |

FOREIGN PATENT DOCUMENTS

| | | |
|---|---|---|
| 59-210482 | 11/1984 | Japan . |
| 63-217394 | 9/1988 | Japan . |
| 321991 | 1/1991 | Japan . |
| 7178963 | 7/1995 | Japan . |
| 7191657 | 7/1995 | Japan . |

*Primary Examiner*—Joseph H. Feild
*Assistant Examiner*—John L. Young

[57] ABSTRACT

A character and symbol pattern generator includes a skeleton data storage device for storing beforehand, for every skeleton pattern. Skeleton data includes coordinate data of each skeleton point at which changes occur at least in the stroke direction of skeleton pattern for forming characters and symbols, two thickness data which represent lengths of two thickness segments of a stroke on the start and end points of the skeleton pattern, and two angle data which represent angles of the two thickness segments with respect to the stroke direction or the horizontal direction. An input device is used to designate the kind and size of the character and symbol. A thickness data calculating device calculates thickness data of each skeleton point from the two thickness data of the start and end points and the coordinate data of each skeleton point. An angle data calculating device calculates angle data of the thickness segment of each skeleton point from the two angle data of the start and end points and the coordinate data of each skeleton point. An outline data generating device generates outline data from the skeleton data and from the thickness data and the angle data of each skeleton point calculated by the calculating devices respectively. A character and symbol pattern synthesizing device synthesizes character and symbol patterns based on the outline data. An output device outputs the character and symbol patterns.

22 Claims, 7 Drawing Sheets

FIG. 2A
FIG. 2B
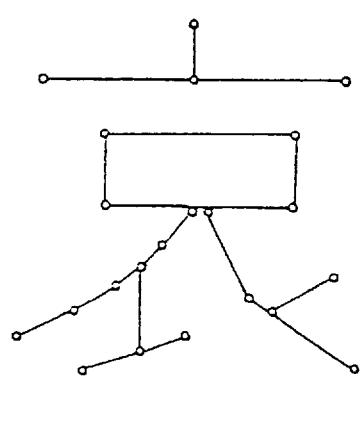
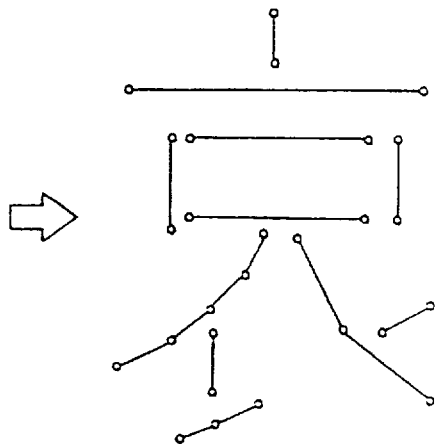

FIG. 3

| NUMBER OF SETS OF SKELETON DATA(11) ||
|---|---|
| 1st SET OF SKELETON DATA | |
| ~~~ | ~~~ |
| 7th SET OF SKELETON DATA | NUMBER OF SKELETON POINTS(5) ||
| ^ | 1st SKELETON POINT DATA | X-COORDINATE 470<br>Y-COORDINATE 500<br>THICKNESS DATA 100<br>ANGLE DATA(a)  0°<br>ANGLE DATA(b) -95°<br>ANGLE DATA(c) -85° |
| ^ | 2nd SKELETON POINT DATA | X-COORDINATE 420<br>Y-COORDINATE 360 |
| ^ | 3rd SKELETON POINT DATA | X-COORDINATE 340<br>Y-COORDINATE 240 |
| ^ | 4th SKELETON POINT DATA | X-COORDINATE 220<br>Y-COORDINATE 140 |
| ^ | 5th SKELETON POINT DATA | X-COORDINATE 100<br>Y-COORDINATE  80<br>THICKNESS DATA 8<br>ANGLE DATA(a) -70°<br>ANGLE DATA(b) -20°<br>ANGLE DATA(c)  20° |
| ~~~ | ~~~ |
| 11th SET OF SKELETON DATA | |

CHARACTER AND SYMBOL PATTERN GENERATOR BASED ON SKELETON DATA INCLUDING THICKNESS CALCULATION

BACKGROUND OF THE INVENTION

1) Field of the Invention

The present invention relates to a character and symbol pattern generator, and more particularly to a character and symbol pattern generator which is applied to electronic information processing equipment such as a word processor, a computer, an electronic notebook and the like and generates character and symbol patterns based on skeleton data for forming the skeleton of characters and symbols.

2) Description of the Related Art

A method for consecutively storing a plurality of point coordinates on the outline of a character, interpolating each point by straight lines or curves to obtain outlines so that character patterns having outline font are generated has conventionally been used.

However, data volume for a character increases if the point coordinates of the outline for forming the character pattern are consecutively present. For this reason, the memory capacity for storing the point coordinates of the outline considerably increases, thereby decreasing the processing speed at which the character patterns are generated.

According to the prior art which solves these problems, the following method and apparatus have been known.

For example, a pattern generating system has been proposed wherein center coordinates and information about a thickness (width) up to an outline and an angle are present for each point which constitutes a skeleton of a stroke, so that the outline points are calculated to generate the outline (see Japanese Laid-Open Patent Application No. HEI 3(1991)-21991).

Also, a character outline generating method has been proposed wherein each point constituting a skeleton of a stroke has information about a skeleton line and a thickness up to an outline, and the start and end points of the stroke have information about an angle formed between the outline direction and the thickness direction to generate the outline (see Japanese Laid-Open Patent Application No. SHO 63(1988)-217394).

A character pattern generator has been proposed wherein each point which constitutes a skeleton has information about the position and the thickness up to the outline to generate the outline (see Japanese Laid-Open Patent Application No. SHO 59(1984)-210482). Furthermore, a character generating device for thickly/thinly processing each outline width for forming outline font (see Japanese Laid-Open Patent Application No. HEI 7(1995)-191657), and a character pattern generating method and device therefor for reducing the time for drawing each outline width for forming outline font (see Japanese Laid-Open Patent Application No. HEI 7(1995)-178963) have been known.

According to the prior art disclosed in Japanese Laid-Open Patent Application Nos. HEI 3(1991)-21991, SHO 63(1988)-217394 and SHO 59(1984)-210482, outline data representing outlines are generated from the skeleton data, the thickness data and the angle data so that data volume for generating character patterns is reduced. In the above methods and apparatus, the thickness data and the angle data are retained for every skeleton point in a stroke to obtain an outline point corresponding to each skeleton point. For this reason, there is a problem that the data volume is not fully reduced when generating character patterns with outline font. Furthermore, Japanese Laid-Open Patent Application Nos. HEI 7(1995)-191657 and HEI 7(1995)-178963 have not disclosed the reduction of data volume to generate characters with outline font.

SUMMARY OF THE INVENTION

In consideration of the foregoing, it is an object of the present invention to provide a character and symbol pattern generator for generating beautiful characters and symbol patterns based on skeleton data for characters and symbols which are formed in smaller data volume.

The present invention provides a character and symbol pattern generator comprising: skeleton data storage means for storing beforehand, for every skeleton pattern, skeleton data including coordinate data of each skeleton point at which changes occur at least in the stroke direction of skeleton pattern for forming characters and symbols, two thickness data which represent lengths of two thickness segments of a stroke on the start and end points of the skeleton pattern, and two angle data which represent angles of the two thickness segments with respect to the stroke direction or the horizontal direction; an input for designating the kind and size of the character and symbol; a thickness data calculator for reading the skeleton data from the skeleton data storage on receipt of the command of the input and calculating thickness data of each skeleton point from the two thickness data of the start and end points and the coordinate data of each skeleton point; an angle data calculator for calculating angle data of the thickness segment of each skeleton point from the two angle data of the start and end points and the coordinate data of each skeleton point; an outline data generator for generating outline data from the skeleton data stored in the skeleton data storage and the thickness data and the angle data of each skeleton point calculated by the respective calculators; character and symbol pattern synthesizer for synthesizing character and symbol patterns based on the generated outline data; and an output for outputting the synthesized character and symbol patterns.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are diagrams for explaining character and skeleton patterns for forming the character;

FIG. 3 is a diagram for explaining the structure of the storage area of a skeleton data storage according to the present invention;

DESCRIPTION OF PREFERRED EMBODIMENTS

Figure 1:
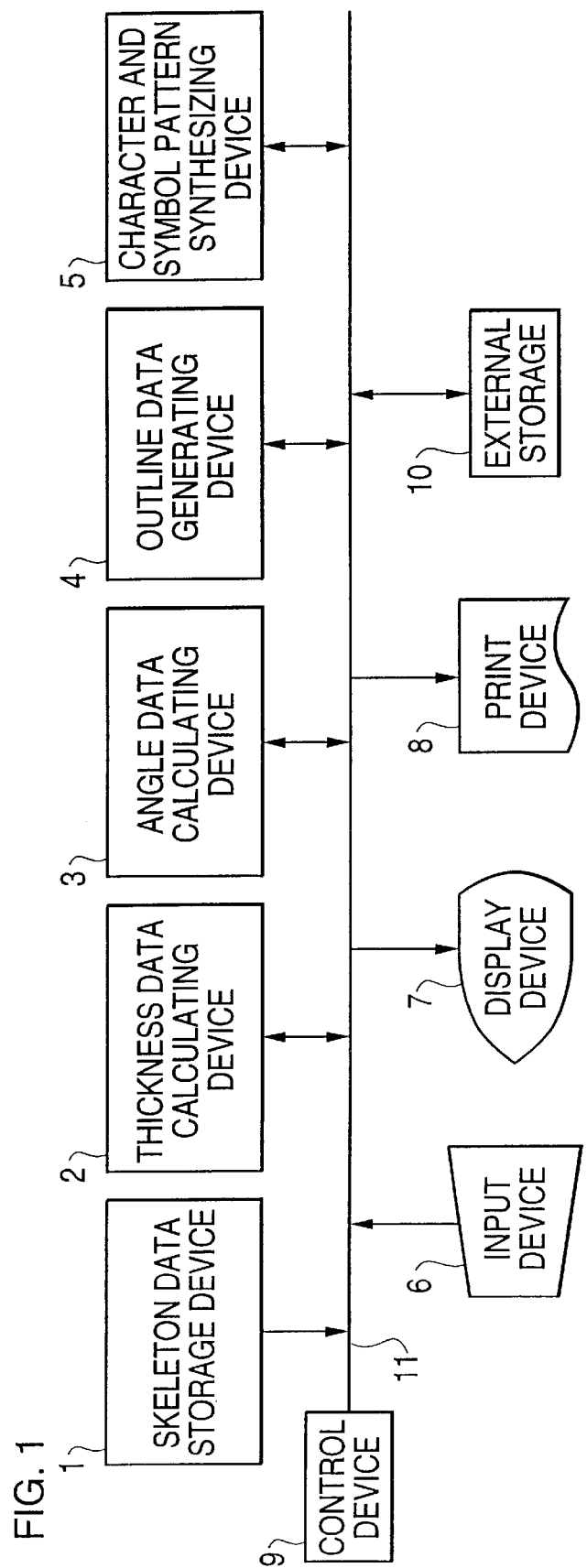
FIG. 1 is a block diagram showing the overall structure of a character and symbol pattern generator according to an embodiment of the present invention.

The present invention provides a character and symbol pattern generator comprising: a skeleton data storage device for storing beforehand, for every skeleton pattern, skeleton data including coordinate data of each skeleton point at which changes occur at least in the stroke direction of skeleton pattern for forming characters and symbols, two thickness data which represent lengths of two thickness segments of a stroke on the start and end points of the skeleton pattern, and two angle data which represent angles of the two thickness segments with respect to the stroke direction or the horizontal direction; an input device for designating the kind and size of the character and symbol; a thickness data calculating device for reading the skeleton data from the skeleton data storage device on receipt of the command of the input device and calculating thickness data of each skeleton point from the two thickness data of the start and end points and the coordinate data of each skeleton point; an angle data calculating device for calculating angle data of the thickness segment of each skeleton point from the two angle data of the start and end points and the coordinate data of each skeleton point; an outline data generating device for generating outline data from the skeleton data stored in the skeleton data storage means and the thickness data and the angle data of each skeleton point calculated by the respective calculating devices; a character and symbol pattern synthesizing device for synthesizing character and symbol patterns based on the generated outline data; and output device for outputting the synthesized character and symbol patterns.

According to the present invention, the memory capacity of the skeleton data storage device for generating the character and symbol patterns can be reduced.

The skeleton data storage device, the thickness data calculating device, the angle data calculating device, the outline data generating device (including an outline point calculating device and an outline interpolating device), and the character and symbol pattern synthesizing device are formed with a microcomputer comprised of a CPU, a ROM, a RAM and an I/O port. In particular, the skeleton data storage device is formed with the ROM and stores the skeleton data for forming character and symbol skeleton patterns.

The ROM stores a program for calculating, in advance, a plurality of skeleton segment lengths from the coordinate data of each skeleton point; a program for calculating the thickness data of each skeleton point from the two thickness data on the start and end points of the skeleton pattern and the plurality of skeleton segment lengths; a program for calculating the angle data of the thickness segment of each skeleton point from the two angle data on the start and end points of the skeleton pattern and the plurality of skeleton segment lengths; a program for generating the outline data from the coordinate data, the thickness data and the angle data of each skeleton point; a program for synthesizing the character and symbol patterns from the two thickness data on the start and end points and the outline data; and the like.

The RAM acts as a work area when the CPU functions as the thickness data calculating means, the angle data calculating device, the outline data generating device and the character and symbol pattern synthesizing device respectively.

The input device is formed with an input mechanism such as a keyboard, a mouse, a pen or the like. The output device is formed with a display unit such as a CRT display or a LCD display, and a printer such as a thermal line printer or a laser printer.

It is preferred that the thickness data calculating means calculates, in advance, a plurality of skeleton segment lengths from coordinate data of each skeleton point for forming skeleton patterns, and calculates thickness data of each skeleton point from the calculated skeleton segment lengths and the two thickness data of the start and end points of the skeleton pattern by length ratio calculation based on the lengths from the start and end points of the stroke to each skeleton point.

The thickness data calculating device having the above structure calculates the thickness data based on the simple length ratio calculation so that the time for calculation can be reduced.

It is preferred that the angle data calculating device calculates, in advance, a plurality of skeleton segment lengths from coordinate data of each skeleton point for forming skeleton patterns, and calculates angle data of a thickness segment of each skeleton point from the calculated skeleton segment lengths and two angle data of the two thickness segments on the start and end points of the skeleton pattern with respect to the stroke direction or the horizontal direction by length ratio calculation based on the lengths from the start and end points of the stroke to each skeleton point.

The angle data calculating device having the above structure calculates the angle data based on the simple length ratio calculation, so that the time for calculation can be reduced.

It is preferred that the outline data generating device further comprises an outline point calculating device for calculating the coordinate data of an outline point based on the skeleton data stored in the skeleton data storage device, the thickness data of each skeleton point calculated by the thickness data calculating device, and the angle data of the thickness segment on each skeleton point calculated by the angle data calculating device, and an outline interpolating device for interpolating the calculated outline points to generate outline data.

The outline data generating device having the above structure can generate outline data in small data volume.

It is preferred that the character and symbol pattern synthesizing device scales the outline data generated by the outline data generating device into the character and symbol patterns having the sizes designated by the input device, and outputs the character and symbol patterns to the output device.

According to the above structure, the character and symbol patterns having specified sizes can be synthesized and output to the output device efficiently.

The present invention will be described in detail with reference to the drawings and should not be construed as being limited by the following embodiments. A character and symbol pattern generator according to the present invention is applied to an information processor such as a word processor, a computer, an electronic notebook and the like, and also applied as an apparatus for generating symbol patterns as well as outline font.

FIG. 1 is a block diagram showing the overall structure of a character and symbol pattern generator according to an embodiment of the present invention.

In FIG. 1, the character and symbol pattern generator comprises a skeleton data storage device 1, a thickness data calculating device 2, an angle data calculating device 3, an outline data generating device 4, a character and symbol pattern synthesizing device 5, an input device 6, a display device (an output device) 7, a print device (an output device) 8, a control device 9, an external storage 10, and a bus line 11.

The skeleton data storage device 1, the thickness data calculating device 2, the angle data calculating device 3, the outline data generating device 4, the character and symbol pattern synthesizing device 5 and the control device 9 are formed with a microcomputer comprised of a CPU, a ROM, a RAM and an I/P port. In particular, the CPU functions as the thickness data calculating device 2, the angle data calculating device 3, the outline data generating device 4, the character and symbol pattern synthesizing device 5, and the control device 9. The control device 9 controls the operation of the overall apparatus, and the processing for inputting and outputting data.

The skeleton data storage device 1 is formed with the ROM, and stores skeleton data for forming the skeleton patterns of characters.

The ROM stores a program for calculating, in advance, a plurality of skeleton segment lengths from the coordinate data of each skeleton point; a program for calculating the thickness data of each skeleton point from the two thickness data on the start and end points of the skeleton pattern and the plurality of skeleton segment lengths; a program for calculating the angle data of the thickness segment of each skeleton point from the two angle data of the start and end points of the skeleton pattern and the plurality of skeleton segment lengths; a program for generating the outline data from the coordinate data, the thickness data, and the angle data of the skeleton points; a program for synthesizing the character and symbol patterns based on the outline data and the two thickness data on the start and end points, and the like.

The RAM acts as a work area when the control device 9, the thickness data calculating device 2, the angle data calculating device 3, the outline data generating device 4 and the character and symbol pattern synthesizing device 5 function respectively.

The input device 6 is formed with an input unit such as a keyboard, a mouse, a pen or the like, and inputs the code and sizes of characters to be output and the like.

The display device 7 is formed with a display unit such as a LCD display or a CRT display, and functions as an output device for displaying character and symbol patterns synthesized by the character and symbol pattern synthesizing device 5.

The print device 8 is formed with a printer such as a thermal line printer or a laser printer, and functions as an output device for printing character and symbol patterns synthesized by the character and symbol pattern synthesizing device 5.

The external storage 10 is formed with a magnetic storage such as a floppy disk or a hard disk, and is used as an auxiliary memory.

The control device 9, the skeleton data storage device 1, the thickness data calculating device 2, the angle data calculating device 3, the outline data generating device 4, the character and symbol pattern synthesizing device 5, the input device 6, the display device 7, the print device 8, and the external storage 10 are connected to one another by the bus line 11 so that the data and control signal of each device can be transmitted. FIGS. 2A and 2B are diagrams for explaining a character and a skeleton pattern that constitutes the character.

For example, in the case where the character shown in FIG. 2A (character code 1605 "哀") is output in outline font, each of the strokes constituting the character (character code 1605 "哀") is converted to a skeleton. Consequently, the character is formed as a group of serial skeleton patterns (a set of skeletons) as shown in FIG. 2B. Each skeleton point has coordinate data.

FIG. 3 is a diagram for explaining the structure of the storage area of the skeleton data storage device 1 according to the present invention. As shown in FIG. 3, the head of data for a character stores the number (N) of sets of skeleton data for forming the character. In case of the character shown in FIG. 3, N is equal to 11. Subsequently, 11 sets of skeleton data are stored.

The head of a set of skeleton data stores the number (P) of skeleton points. In the case of the seventh set of skeleton data, P is equal to 5. Subsequently, the skeleton data for five skeleton points are stored. The first and fifth skeleton point data of the seventh set represent edge points, and, therefore, have X–Y coordinate values, thickness data representing the distance to an outline, angle data (a) representing the direction of a thickness segment, and angle data (b) and (c) representing the direction of the generated outline at the skeleton point. The second, third and fourth skeleton point data have only X–Y coordinate values. The character is expressed by X–Y coordinates of 1000×1000.

More specifically, the skeleton data storage device 1 hierarchically stores, for each character, the number (N) of sets of skeleton patterns (skeleton data) for forming the character, the number (P) of skeleton points in the skeleton pattern, and P skeleton point data.

The skeleton point data of the first (start) and the Pth (end) points store the X–Y coordinate data of the skeleton point, and the thickness data which represents the distance between the skeleton point and the outline of the generated stroke, the angle data (a) which represents the direction of the thickness segment, and the angle data (b) and (c) which represent the direction of the generated outline.

The angle data (b) and (c) will be described below. For each skeleton point other than the start or end point, only the X–Y coordinate data are stored The thickness data calculating device 2 calculates the thickness data to the outline for the skeleton points other than the two edges of the skeleton pattern out of a given set of skeleton data. More specifically, a plurality of skeleton segment lengths are calculated from the coordinate data of each skeleton point in the skeleton pattern, and the thickness data is calculated or each skeleton point from the calculated skeleton segment lengths and the two thickness data on the start and end points of the skeleton pattern by length ratio calculation based on the lengths from the start and end points of the stroke to each skeleton point.

The angle data calculating device 3 calculates the angle data of the direction of a thickness segment for each of the skeleton points other than the two edges of the skeleton pattern out of a given set of skeleton data. More specifically, the angle data calculating device 3 calculates a plurality of skeleton segment lengths, in advance, from the coordinate data of each skeleton point in the skeleton pattern, and the angle data of the direction of the thickness segment for each skeleton point is calculated from the calculated skeleton segment lengths and the data for two angles formed by two thickness segments of the start and end points of the skeleton pattern with respect to the stroke direction or the horizontal direction by length ratio calculation based on the lengths from the start and end points of the stroke to each skeleton point.

The outline data generating device 4 generates outline data based on the coordinate data of each skeleton point in a set of stored skeleton data, the thickness data of each skeleton point (which include the calculated thickness data), the angle data (a) of each skeleton point (which include the calculated angle data), and the angle data (b) and (c) of the generated outline on the two edges of the set of skeleton data.

First of all, the coordinate data of the outline point of the stroke is obtained from the coordinate data, the thickness data and the angle data of each skeleton point. The shape of the stroke which connects outline points is obtained based on the coordinate data of the obtained outline point and the angle data (b) and (c) of the outline on the two edge points so that outline data are generated.

The character and symbol pattern synthesizing device 5 stores and keeps outline data which represents the outline generated from a set of skeleton point data until all outlines for each character and symbol are generated. When all outline data for each character and symbol are generated, they are scaled to the outline data of the specified character and symbol sizes. In addition, the inside of the outline is painted out so that character and symbol patterns are synthesized.

The control device 9 outputs the character and symbol patterns which are synthesized by the character and symbol pattern synthesizing device 5 to the display device 7 and the print device 8.

Figure 4:
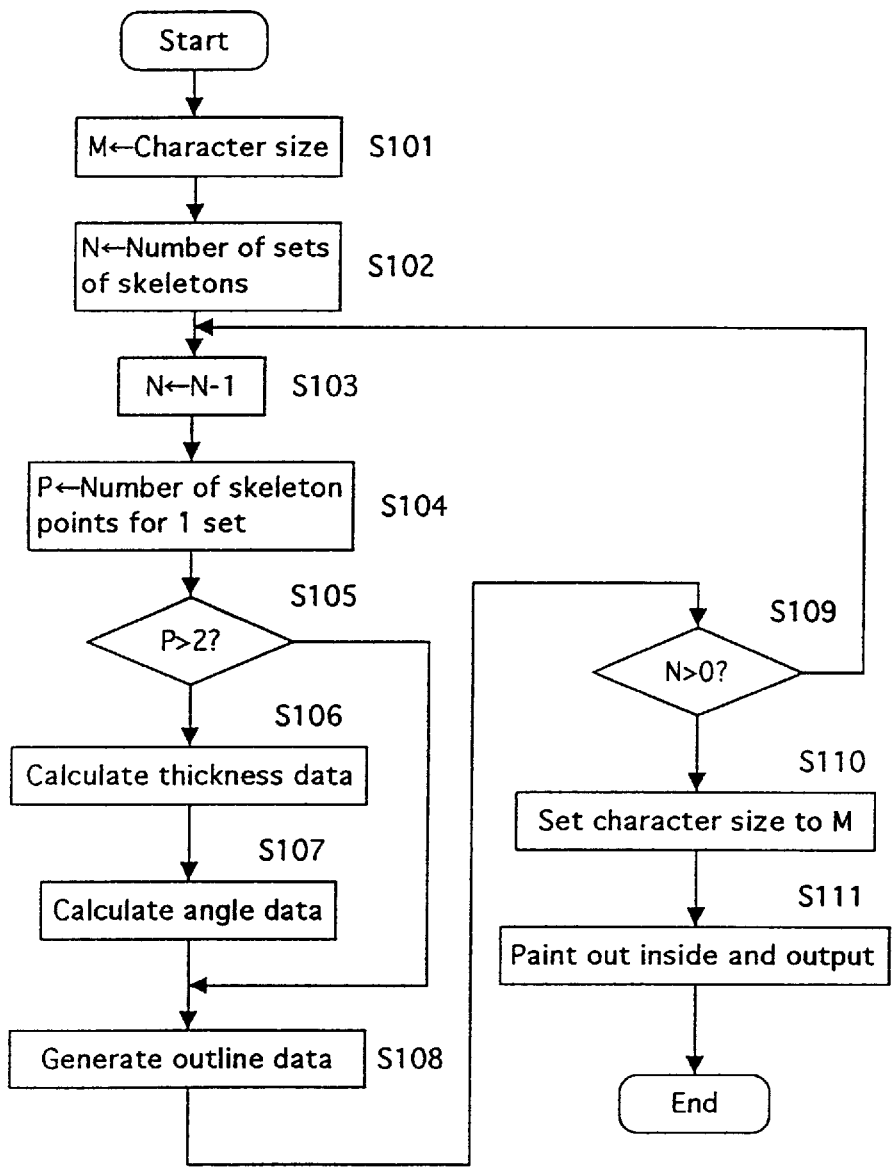
FIG. 4 is a flowchart showing the processing of the character and symbol pattern generator according to the present invention.

FIG. 4 is a flowchart showing the processing of the character and symbol pattern generator according to the present invention. The processing of each step will be described in detail with reference to the flowchart.

Step S101: When the code and size of a character to be output are input by the input device 6, the character size is substituted for a variable M.

Step S102: The address of the skeleton data for the character stored in the skeleton data storage device 1 is calculated from the character code. The number of sets of skeleton data forming the character is substituted for a variable N.

Step S103: The value of the variable N is decremented by 1. The value of the variable N is used for checking the number of sets of unprocessed skeleton data at Step S109.

Step S104: The number of skeleton points in a set of skeleton data is substituted for a variable P. The value of the variable P is used for deciding whether the flow of processing should branch or not at Step S105.

Step S105: It is decided whether the value of the variable P is greater than 2 or not. If the value of the variable P is greater than 2, there are skeleton points other than the two edge points. In order to calculate the angle data and the thickness data up to the outline for these points, a set of (P) skeleton data are transferred from the skeleton data storage device 1 to the thickness data calculating device 2 so that the routine proceeds to Step S106. If the value of the variable P is not greater than 2, there is no skeleton point other than the two edge points. Consequently, the skeleton data are transferred to the outline data generating device 4 so that the routine proceeds to Step S108.

Step S106: The thickness data of the second to the (P-1)th skeleton points in the set of (P) skeleton data are calculated and then transferred to the angle data calculating device 3.

Figure 5:
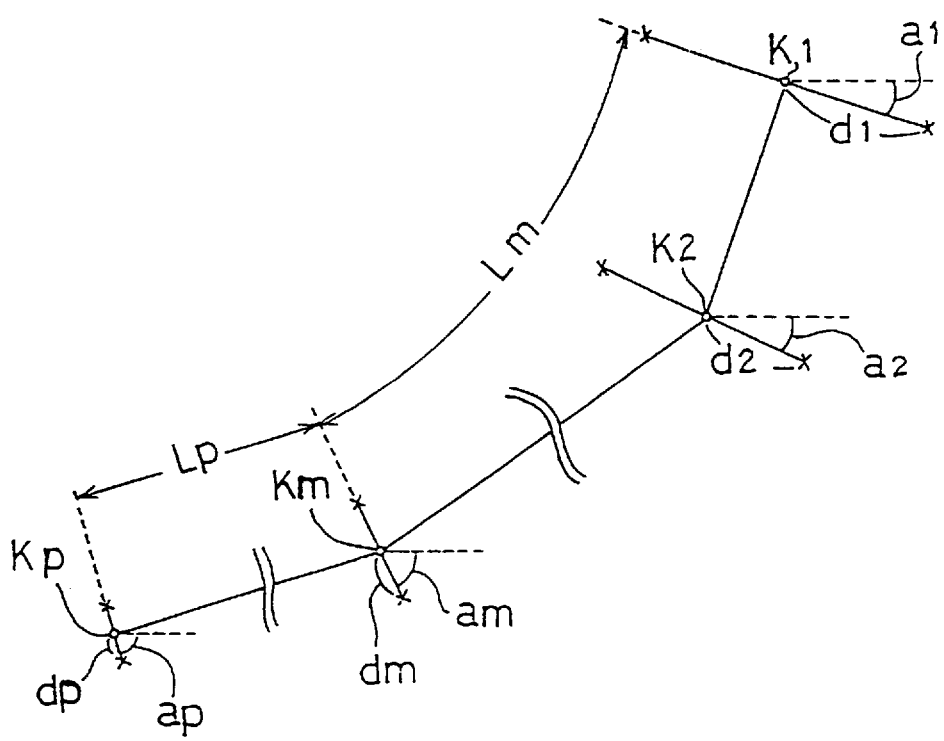
FIG. 5 is a diagram for explaining a method for calculating thickness data and angle data according to the present invention.

FIG. 5 is a diagram for explaining a method for calculating thickness data and angle data according to the present invention. The method for calculating the thickness data will be described with reference to FIG. 5. Thickness data dm of the mth skeleton point Km in the set of (P) skeleton points K1 to Kp is calculated from the distance (length) ratio based on the thickness data d1 of the skeleton point K1, the thickness data dp of the skeleton point Kp, the distance (length) Lm along a center line from a skeleton point K1 to the skeleton point Km, and the distance (length) Lp along the center line from the skeleton point Km to the skeleton point Kp by the following equation:

$$dm=(Lp \times d1+Lm \times dp)/(Lm+Lp)$$

wherein (Lm+Lp) indicates a stroke for a skeleton pattern, $$Lm=\{(X_2-X_1)^2+(Y_2-Y_1)^2\}^{1/2}+ \ldots +\{(X_m-X_m-1)^2+(Y_m-Y_{m-1})^2\}^{1/2},$$
and $$Lp=\{(X_{m+1}-X_m)^2+(Y_{m+1}-Y_m)^2\}^{1/2}+ \ldots +\{(X_p-X_{p-1})^2+(Y_p-Y_{p-1})^2\}^{1/2}.$$

Figure 6:
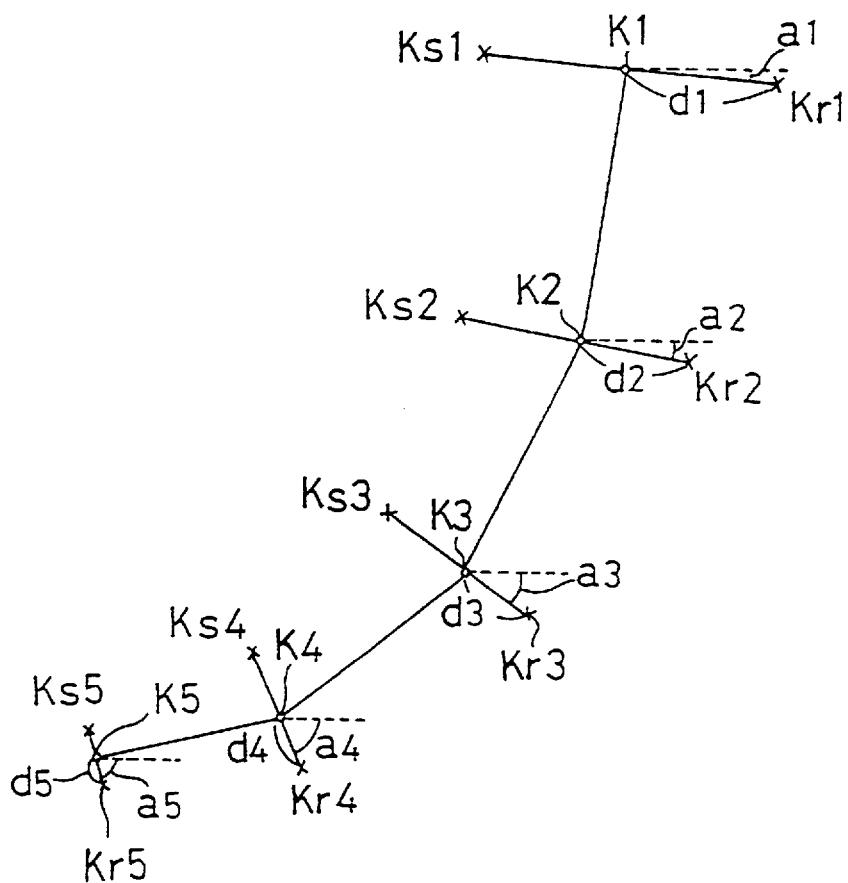
FIG. 6 is a diagram for explaining the seventh set of skeleton pattern shown in FIG. 3.

FIG. 6 is a diagram for explaining the seventh set of skeleton patterns shown in FIG. 3. It is assumed that the skeleton point data are expressed by the skeleton pattern shown in FIG. 6. Points K1 to K5 form a set of skeleton points, and d1 and d5 are the thickness data of the two edge points K1 and K5 of the skeleton point data. For simplicity, it is assumed that the distances between skeleton points are the same. The thickness data d2 to d4 of the points K2 to K4 are calculated based on the distance ratio of each point to the points K1 and K5 by the following equations.

$$d2=(3 \times d1+1 \times d5)/(1+3)$$

$$d3=(2 \times d1+2 \times d5)/(2+2)$$

$$d4=(1 \times d1+3 \times d5)/(3+1)$$

Step S107: Angle data of the second to (P-1)th skeleton points in the set of (P) skeleton data are calculated and then transferred to the outline data generating device 4.

The method for calculating the angle data will be described with reference to FIG. 5. Angle data am of the mth skeleton point Km in the set of (P) skeleton points K1 to Kp is calculated from the distance ratio based on the angle a1 of the point K1, the angle ap of the point Kp, the distance Lm between the points K1 and Km, and the distance Lp between the points Km and Kp by the following equation:

$$am=(Lp \times a1+Lm \times ap)/(Lm+Lp)$$

The seventh set of skeleton point data shown in FIG. 3 will be described with reference to FIG. 6. In FIG. 6, a1 and a5 are angle data (a) on the two edge points K1 and KS of the skeleton data. If the distances between the skeleton points are the same, the angles a2 to a4 of the points K2 to K4 are calculated based on the distance ratio of each point to the points K1 and K5 by the following equations.

$$a2=(3 \times a1+1 \times a5)/(1+3)$$

$$a3=(2 \times a1+2 \times a5)/(2+2)$$

$$a4=(1 \times a1+3 \times a5)/(3+1)$$

Step S108: Outline data is generated from the set of (P) skeleton data and then transferred to the character and symbol pattern synthesizing device.

Figure 7A:
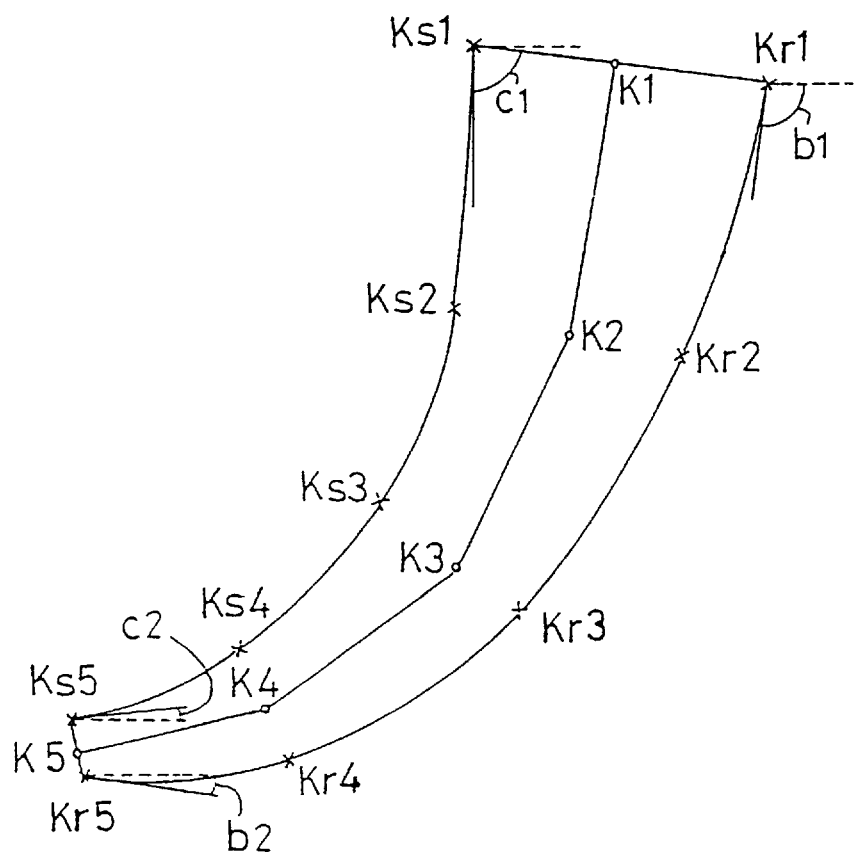
FIGS. 7A and 7B are diagrams for explaining a method for generating outline data according to the present invention.
Figure 7B:
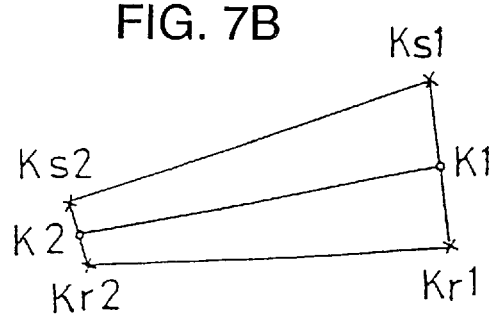

FIGS. 7A and 7B are diagrams for explaining a method for generating outline data according to the present invention. The method for generating the outline data will be described with reference to FIGS. 7A and 7B. FIG. 7A shows the case where P is equal to 5.

As shown in FIG. 7A, if P is not equal to 2, points Kr1 to Kr5 and Ks1 to Ks5 on both sides are obtained based on the thickness data and the angle data of the skeleton points K1 to K5.

Assuming that the coordinates of the point K are (Xk, Yk), the coordinates of an outline point Kr on the right of the point K are (Xkr, Ykr), the coordinates of an outline point Ks on the left of the point K are (Xks, Yks), and the thickness data and the angle data of the point K are dk and ak, the following equations are used.

$Xkr=Xk+dk \times \text{COS}(ak), Ykr=Yk+dk \times \text{SIN}(ak)$ $Xks=Xk-dk \times \text{COS}(ak), Yks=yk-dk \times \text{SIN}(ak)$ Now, b1 and c1 are angle data (b) and (c) of the points Kr1 and Ks1, and b2 and c2 are angle data (b) and (c) of the points Kr5 and Ks5. Then, an approximating curve from the point Kr1 to the point Kr5 is obtained so that the curve passes through the points Kr1 and Kr5, the gradient of the tangent on the point Kr1 is b1, and the gradient of the tangent on the point Kr5 is b2.

In the same manner, an approximating curve from the point Ks5 to the point Ks1 is obtained so that the curve passes through the points Ks5 and Ks1, the gradient of the tangent on the point Ks5 is c2, and the gradient of the tangent on the point Ks1 is c1. Curve approximation is performed by a known method such as circular approximation, spline curve approximation, Bézier curve approximation or the like so as to obtain points necessary for the curve representation. The start and end points of the two curves are connected to each other respectively to form a closed outline shape, which is expressed by outline data.

As shown in FIG. 7B, if P is equal to 2, the points Kr1 and Kr2 and the points Ks1 and Ks2 on both sides are obtained from the size and angle of the skeleton points K1 and K2. Then, a straight line which connects the points Kr1 and Kr2 and a straight line which connects the points Ks2 and Ks1 are obtained. The start and end points of these straight lines are connected to each other respectively to form a quadrangle which is expressed by outline data.

Step S109: The variable N is compared with 0. If N is greater than 0, there still are sets of unprocessed skeleton data within the character. In this case, Step S102 is repeated. If N is equal to 0, all sets of skeleton data within the character have been processed.

Step S110: All outline data generated from all sets of skeleton data within the character are stored in the character and symbol pattern synthesizing device 5. These outline data are scaled in such a manner that a character size corresponds to the content of the variable M.

Step S111: The inside of the outline for a character is painted out so that character patterns are synthesized. The synthesized character patterns are output to the display device 7 and the print device 8 according to the command of the input device 6.

In this way, the skeleton points other than the two edge points which form skeleton data have neither thickness data nor angle data but have only coordinate data. For these points, the thickness data and the angle data are calculated by the thickness data calculating device and the angle data calculating device. Consequently, a character pattern having outline font can be generated by the skeleton data of a smaller volume than in the prior art. In addition, outline data having various sizes can be generated efficiently by the scaling function.

While the character pattern having an outline font has been described above, the same effects can be produced for the symbol pattern.

According to the present invention, character and symbol patterns of high quality can be generated from a smaller amount of skeleton data.

Furthermore, since the thickness data and the angle data are calculated according to length ratio calculation of a stroke, the time for calculation can be reduced.

In addition, the character and symbol patterns having various sizes can be generated efficiently by the scaling function.

Although the present invention has fully been described by way of examples with reference to the accompanying drawings, it is to be understood that various changes and modifications will be apparent to those skilled in the art. Therefore, unless such changes and modifications depart otherwise from the scope of the invention, they should be construed as being included therein.

What is claimed is:

1. A character and symbol pattern generator comprising:

skeleton data storage means for storing beforehand, for every skeleton pattern, skeleton data including coordinate data of each skeleton point at which changes occur at least in the stroke direction of the skeleton pattern for forming characters and symbols, two thickness data which represent lengths of two thickness segments of a stroke on the start and end points of the skeleton pattern, and two angle data which represent angles of the two thickness segments with respect to the stroke direction or the horizontal direction;

input means for designating the kind and size of the character and symbol;

thickness data calculating means for reading the skeleton data from the skeleton data storage means on receipt of the command of the input means and calculating thickness data of each skeleton point from the two thickness data of the start and end points and the coordinate data of each skeleton point;

angle data calculating means for calculating angle data of the thickness segment of each skeleton point from the two angle data of the start and end points and the coordinate data of each skeleton point;

outline data generating means for generating outline data from the skeleton data stored in the skeleton data storage means and the thickness data and the angle data of each skeleton point calculated by the calculating means respectively;

character and symbol pattern synthesizing means for synthesizing character and symbol patterns based on the generated outline data; and output means for outputting the synthesized character and symbol patterns, wherein the thickness data calculating means calculates, in advance, the length of each of skeleton segments from the coordinate data of each skeleton point in the skeleton pattern, and calculates the thickness data of each skeleton point from the calculated skeleton segment lengths and the two thickness data of the start and end points of the skeleton pattern by length ratio calculation based on the lengths from the start and end points of the stroke to each skeleton point.

2. The character and symbol pattern generator according to claim 1, wherein the outline data generating means further comprises outline point calculating means for calculating coordinate data of an outline point based on the skeleton data stored in the skeleton data storage means, the thickness data of each skeleton point calculated by the thickness data calculating means, and the angle data of the thickness segment of each skeleton point calculated by the angle data calculating means, and outline interpolating means for interpolating the calculated outline points to generate outline data.

3. The character and symbol pattern generator according to claim 1, wherein the character and symbol pattern synthesizing means scales the outline data generated by the outline data generating means into the character and symbol patterns having the sizes designated by the input means, and outputs the character and symbol patterns to the output means.

4. A character and symbol pattern generator comprising:

skeleton data storage means for storing beforehand, for every skeleton pattern, skeleton data including coordinate data of each skeleton point at which changes occur at least in the stroke direction of the skeleton pattern for forming characters and symbols, two thickness data which represent lengths of two thickness segments of a stroke on the start and end points of the skeleton pattern, and two angle data which represent angles of the two thickness segments with respect to the stroke direction or the horizontal direction;

input means for designating the kind and size of the character and symbol;

thickness data calculating means for reading the skeleton data from the skeleton data storage means on receipt of the command of the input means and calculating thickness data of each skeleton point from the two thickness data of the start and end points and the coordinate data of each skeleton point;

angle data calculating means for calculating angle data of the thickness segment of each skeleton point from the two angle data of the start and end points and the coordinate data of each skeleton point;

outline data generating means for generating outline data from the skeleton data stored in the skeleton data storage means and the thickness data and the angle data of each skeleton point calculated by the calculating means respectively;

character and symbol pattern synthesizing means for synthesizing character and symbol patterns based on the generated outline data; and output means for outputting the synthesized character and symbol patterns, wherein the angle data calculating means calculates, in advance, the length of each of skeleton segments from coordinate data of each skeleton point in the skeleton pattern, and calculates the angle data of a thickness segment of each skeleton point from the calculated skeleton segment lengths and the two angle data of two thickness segments on the start and end points of the skeleton pattern with respect to the stroke direction or the horizontal direction by length ratio calculation based on the lengths from the start and end points of the stroke to each skeleton point.

5. The character and symbol pattern generator according to claim 4, wherein the outline data generating means further comprises outline point calculating means for calculating coordinate data of an outline point based on the skeleton data stored in the skeleton data storage means, the thickness data of each skeleton point calculated by the thickness data calculating means, and the angle data of the thickness segment of each skeleton point calculated by the angle data calculating means, and outline interpolating means for interpolating the calculated outline points to generate outline data.

6. The character and symbol pattern generator according to claim 4, wherein the character and symbol pattern synthesizing means scales the outline data generated by the outline data generating means into the character and symbol patterns having the sizes designated by the input means, and outputs the character and symbol patterns to the output means.

7. A method for generating character and symbol patterns comprising:

storing, in a memory, for every skeleton pattern, skeleton data including coordinate data of each skeleton point at which changes occur at least in the stroke direction of the skeleton pattern for forming characters and symbols, two thickness data which represent lengths of two thickness segments of a stroke on the start and end points of the skeleton pattern, and two angle data which represent angles of the two thickness segments with respect to the stroke direction or the horizontal direction;

designating the kind and size of the character and symbol;

reading skeleton data from the memory in accordance with the kind and size of the character and symbol from the designating;

calculating thickness data of each skeleton point of the skeleton data read by the reading from the two thickness data of the start and end points and the coordinate data of each skeleton point;

calculating angle data of the thickness segment of each skeleton point from the two angle data of the start and end points and the coordinate data of each skeleton point;

generating outline data from stored skeleton data and the thickness data and the angle data of each skeleton point calculated by the respective calculating;

synthesizing character and symbol patterns based on the generated outline data; and outputting the synthesized character and symbol patterns, wherein the calculating of the thickness includes calculating, in advance, a length of each of the skeleton segments from the coordinate data of each skeleton point in the skeleton pattern, and calculating the thickness data of each skeleton point from calculated skeleton segment lengths and the two thickness data of the start and end points of the skeleton pattern with respect to the stroke direction or the horizontal direction by length ratio calculation based on the lengths from the start and end points of the stroke to each skeleton point.

8. The method according to claim 7, wherein the generating further comprises calculating coordinate data of an outline point based on stored skeleton, calculated thickness data of each skeleton point, and calculated angle data of the thickness segment of each skeleton point, and interpolating calculated outline points to generate outline data.

9. The method according to claim 7, wherein the synthesizing includes scaling generated outline data into the character and symbol patterns having designated sizes and supplying scaled character and symbol patterns for said outputting.

10. A method for generating character and symbol pattern comprising:

storing, in a memory, for every skeleton pattern, skeleton data including coordinate data of each skeleton point at which changes occur at least in the stroke direction of the skeleton pattern for forming characters and symbols, two thickness data which represent lengths of two thickness segments of a stroke on the start and end points of the skeleton pattern, and two angle data which represent angles of the two thickness segments with respect to the stroke direction or the horizontal direction;

designating the kind and size of the character and symbol;

reading skeleton data from the memory in accordance with the kind and size of the character and symbol from the designating;

calculating thickness data of each skeleton point of the skeleton data read by the reading from the two thickness data of the start and end points and the coordinate data of each skeleton point;

calculating angle data of the thickness segment of each skeleton point from the two angle data of the start and end points and the coordinate data of each skeleton point;

generating outline data from stored skeleton data and the thickness data and the angle data of each skeleton point calculated by the respective calculating;

synthesizing character and symbol patterns based on the generated outline data; and outputting the synthesized character and symbol patterns, wherein the calculating of the angle data includes calculating, in advance, a length of each of the skeleton segments from coordinate data of each skeleton point in the skeleton pattern, and calculates the angle data of a thickness segment of each skeleton point from calculated skeleton segment lengths and the two angle data of two thickness segments on the start and end points of the skeleton pattern with respect to the stroke direction or the horizontal direction by length ratio calculation based on the lengths from the start and end points of the stroke to each skeleton point.

11. The method according to claim 10, wherein the generating further comprises calculating coordinate data of an outline point based on stored skeleton, calculated thickness data of each skeleton point, and calculated angle data of the thickness segment of each skeleton point, and interpolating calculated outline points to generate outline data.

12. The method according to claim 10, wherein the synthesizing includes scaling generated outline data into the character and symbol patterns having designated sizes and supplying scaled character and symbol patterns for said outputting.

13. A character and symbol pattern generator comprising:

skeleton data storage means for storing beforehand, for every skeleton pattern, skeleton data including coordinate data of each skeleton point at which changes occur at least in the stroke direction of the skeleton pattern for forming characters and symbols, two thickness data which represent lengths of two thickness segments of a stroke on the start and end points of the skeleton pattern, and two angle data which represent angles of the two thickness segments with respect to the stroke direction or the horizontal direction;

input means for designating the kind and size of the character and symbol;

thickness data calculating means for reading the skeleton data from the skeleton data storage means on receipt of the command of the input means and calculating thickness data of an interior skeleton point between the start and end points from the two thickness data of the start and end points and the coordinate data of the interior skeleton point;

angle data calculating means for calculating angle data of the thickness segment of the interior skeleton point from the two angle data of the start and end points and the coordinate data of the interior skeleton point;

outline data generating means for generating outline data from the skeleton data stored in the skeleton data storage means and the thickness data and the angle data of the interior skeleton point calculated by the calculating means respectively;

character and symbol pattern synthesizing means for synthesizing character and symbol patterns based on the generated outline data; and output means for outputting the synthesized character and symbol patterns.

14. The character and symbol pattern generator according to claim 13, wherein the thickness data calculating means calculates, in advance, the length of skeleton segments from the coordinate data of the interior skeleton point in the skeleton pattern, and calculates the thickness data of the interior skeleton point from the calculated skeleton segment lengths and the two thickness data of the start and end points of the skeleton pattern by length ratio calculation based on the lengths from the start and end points of the stroke to the interior skeleton point.

15. The character and symbol pattern generator according to claim 13, wherein the angle data calculating means calculates, in advance, the length of skeleton segments from coordinate data of the interior skeleton point in the skeleton pattern, and calculates the angle data of a thickness segment of the interior skeleton point from the calculated skeleton segment lengths and the two angle data of two thickness segments on the start and end points of the skeleton pattern with respect to the stroke direction or the horizontal direction by length ratio calculation based on the lengths from the start and end points of the stroke to the interior skeleton point.

16. The character and symbol pattern generator according to claim 13, wherein the outline data generating means further comprises outline point calculating means for calculating coordinate data of an outline point based on the skeleton data stored in the skeleton data storage means, the thickness data of the interior skeleton point calculated by the thickness data calculating means, and the angle data of the thickness segment of the interior skeleton point calculated by the angle data calculating means, and outline interpolating means for interpolating the calculated outline points to generate outline data.

17. The character and symbol pattern generator according to claim 13, wherein the character and symbol pattern synthesizing means scales the outline data generated by the outline data generating means into the character and symbol patterns having the sizes designated by the input means, and outputs the character and symbol patterns to the output means.

18. A method for generating character and symbol pattern comprising:

storing, in a memory, for every skeleton pattern, skeleton data including coordinate data of the interior skeleton point at which changes occur at least in the stroke direction of the skeleton pattern for forming characters and symbols, two thickness data which represent lengths of two thickness segments of a stroke on the start and end points of the skeleton pattern, and two angle data which represent angles of the two thickness segments with respect to the stroke direction or the horizontal direction;

designating the kind and size of the character and symbol;

reading skeleton data from the memory in accordance with the kind and size of the character and symbol from the designating;

calculating thickness data of an interior skeleton point between the start and end points of the skeleton data read by the reading from the two thickness data of the start and end points and the coordinate data of the interior skeleton point;

calculating angle data of the thickness segment of the interior skeleton point from the two angle data of the start and end points and the coordinate data of the interior skeleton point;

generating outline data from stored skeleton data and the thickness data and the angle data of the interior skeleton point calculated by the respective calculating;

synthesizing character and symbol patterns based on the generated outline data; and outputting the synthesized character and symbol patterns.

19. The method according to claim 18, wherein the calculating of the thickness includes calculating, in advance, a length of skeleton segments from the coordinate data of the interior skeleton point in the skeleton pattern, and calculating the thickness data of the interior skeleton point from calculated skeleton segment lengths and the two thickness data of the start and end points of the skeleton pattern with respect to the stroke direction or the horizontal direction by length ratio calculation based on the lengths from the start and end points of the stroke to the interior skeleton point.

20. The method according to claim 18, wherein the calculating of the angle data includes calculating, in advance, a length of skeleton segments from coordinate data of the interior skeleton point in the skeleton pattern, and calculates the angle data of a thickness segment of the interior skeleton point from calculated skeleton segment lengths and the two angle data of two thickness segments on the start and end points of the skeleton pattern with respect to the stroke direction or the horizontal direction by length ratio calculation based on the lengths from the start and end points of the stroke to the interior skeleton point.

21. The method according to claim 18, wherein the generating further comprises calculating coordinate data of an outline point based on stored skeleton, calculated thickness data of the interior skeleton point, and calculated angle data of the thickness segment of the interior skeleton point, and interpolating calculated outline points to generate outline data.

22. The method according to claim 18, wherein the synthesizing includes scaling generated outline data into the character and symbol patterns having designated sizes and supplying scaled character and symbol patterns for said outputting.

* * * * *